(12) United States Patent
Tsukizaki et al.

(10) Patent No.: US 10,279,673 B2
(45) Date of Patent: May 7, 2019

(54) MODE TRANSITION CONTROL DEVICE FOR HYBRID VEHICLE

(71) Applicant: Nissan Motor Co., Ltd., Yokohama-shi, Kanagawa (JP)

(72) Inventors: Atsushi Tsukizaki, Kanagawa (JP); Ryohey Toyota, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 15/571,526

(22) PCT Filed: Jun. 3, 2015

(86) PCT No.: PCT/JP2015/066064
§ 371 (c)(1),
(2) Date: Nov. 3, 2017

(87) PCT Pub. No.: WO2016/194172
PCT Pub. Date: Dec. 8, 2016

(65) Prior Publication Data
US 2018/0141426 A1    May 24, 2018

(51) Int. Cl.
*B60K 6/442* (2007.10)
*B60K 6/547* (2007.10)
(Continued)

(52) U.S. Cl.
CPC ............. *B60K 6/442* (2013.01); *B60K 6/547* (2013.01); *B60L 15/20* (2013.01); *B60L 15/2054* (2013.01); *B60W 10/06* (2013.01); *B60W 10/08* (2013.01); *B60W 10/11* (2013.01); *B60W 20/20* (2013.01); *B60W 20/30* (2013.01); *B60W 30/19* (2013.01); *F16H 61/02* (2013.01);
(Continued)

(58) Field of Classification Search
CPC ....... B60W 20/20; B60W 30/19; B60K 6/442; B60K 6/547; F16H 61/02; B60L 15/20; B60L 15/2054
See application file for complete search history.

(56) References Cited

U.S. PATENT DOCUMENTS

| 2003/0104901 A1 | 6/2003 | Fukushima et al. |
| 2007/0227791 A1* | 10/2007 | Ueno ............ B60K 6/387 180/65.245 |
| 2010/0133027 A1 | 6/2010 | Hung et al. |
| 2012/0245783 A1 | 9/2012 | Tamagawa |
| 2013/0231815 A1* | 9/2013 | Tanishima ............ B60K 6/48 701/22 |
| 2016/0193994 A1* | 7/2016 | Ando ............ B60W 20/19 701/22 |

FOREIGN PATENT DOCUMENTS

| CN | 102666234 A | 9/2012 |
| CN | 104080673 A | 10/2014 |

(Continued)

*Primary Examiner* — Stacey A Fluhart
(74) *Attorney, Agent, or Firm* — Global IP Counselors, LLP

(57) ABSTRACT

A mode transition control device is provided for a hybrid vehicle. The mode transition control device reduces a sensation of discomfort that may be imparted to a driver at a time of a mode transition from a series traveling mode to a parallel traveling mode during traveling. During mode transition from the series traveling mode to the parallel traveling mode in a hybrid vehicle, a gear shift stage is selected such that a rotational speed change amount of an internal combustion engine accompanying mode transition is less than or equal to a predetermined threshold value.

14 Claims, 10 Drawing Sheets

(51) Int. Cl.
  *B60L 15/20* (2006.01)
  *F16H 61/02* (2006.01)
  *B60W 10/06* (2006.01)
  *B60W 10/08* (2006.01)
  *B60W 10/11* (2012.01)
  *B60W 30/19* (2012.01)
  *B60W 20/30* (2016.01)
  *B60W 20/20* (2016.01)

(52) U.S. Cl.
  CPC . *B60W 2510/0638* (2013.01); *B60W 2520/10* (2013.01); *B60W 2540/10* (2013.01); *B60W 2710/0644* (2013.01); *B60W 2710/0661* (2013.01); *B60W 2710/1005* (2013.01); *Y02T 10/6234* (2013.01); *Y02T 10/6286* (2013.01); *Y02T 10/7258* (2013.01)

(56) References Cited

FOREIGN PATENT DOCUMENTS

| | | |
|---|---|---|
| JP | 10-14296 A | 1/1998 |
| JP | 2000-71815 A | 3/2000 |
| JP | 2003-146115 A | 5/2003 |
| JP | 2005-226810 A | 8/2005 |
| JP | 2005-231585 A | 9/2005 |
| JP | 2006-46521 A | 2/2006 |
| JP | 2007-168551 A | 7/2007 |
| JP | 2011-218836 A | 11/2011 |
| JP | 2014-519432 A | 8/2014 |

\* cited by examiner

GEAR SHIFT PATTERN

|  |  | C1 | | |
|---|---|---|---|---|
| C2 | C3 | Left | N | Right |
| N | N | EV – ICEgen | Neutral | EV – ICE 3rd |
| | Left | EV 1st ICE 1st | EV 1st ICE – (Se-HEV) | EV 1st ICE 3rd |
| | | Lock | EV 1st ICE 2nd | Lock |
| Left | N | EV 1.5 ICE 2nd | EV – ICE 2nd | Lock |
| | Right | Lock | EV 2nd ICE 2nd | Lock |
| N | | EV 2nd ICE 3rd' | EV 2nd ICE – | EV 2nd ICE 3rd |
| | | Lock | EV 2nd ICE 4th | Lock |
| Right | N | EV 2.5 ICE 4th | EV – ICE 4th | Lock |
| | Left | Lock | EV 1st ICE 4th | Lock |

FIG. 4

MODE TRANSITION CONTROL DEVICE FOR HYBRID VEHICLE

CROSS-REFERENCE TO RELATED APPLICATIONS

This application is a U.S. National stage application of International Application No. PCT/JP2015/066064, filed Jun. 3, 2015.

BACKGROUND

Field of the Invention

The present invention relates to a mode transition control device for a hybrid vehicle that carries out a mode transition from a series traveling mode to a parallel traveling mode by a shift of a transmission.

Background Information

Conventionally, a control device that has a series traveling mode in which the drive wheels are driven using only motor power and a parallel traveling mode in which the drive wheels are driven using motor power and engine power, and that selects between these traveling modes based on the traveling state of the vehicle, is known (for example, refer to Japanese Laid-Open Patent Application No. 2005-226810—Patent Document 1).

SUMMARY

In the conventional device, for example, the series traveling mode is set at the time of a start when drive torque is required, and the parallel traveling mode is set if a high output is required as the vehicle speed is increased. However, if there is a great change in the rotational speed of the engine when switching from the series traveling mode to the parallel traveling mode, there is the risk of imparting discomfort to the driver.

In view of the problem described above, an object of the present invention is to provide a mode transition control device for a hybrid vehicle that reduces discomfort that may be imparted to the driver at the time of a mode transition from a series traveling mode to a parallel traveling mode during travel.

In order to achieve the object above, the mode transition control device for a hybrid vehicle of the present invention comprises a first electric motor, a second electric motor, and an internal combustion engine as power sources, and a transmission that is able to shift and transmit the output from the power sources to the drive wheel. In the transmission, a mode transition is possible between a series traveling mode, in which the drive wheel is driven by the first electric motor while generating power with the second electric motor by being driven by the internal combustion engine, and a parallel traveling mode, in which the drive wheel is driven by both the first electric motor and the internal combustion engine. The hybrid vehicle is provided with a mode transition controller for switching the ICE gear shift stage that shifts the output of the internal combustion engine if there is a mode transition request. The mode transition controller selects, as the ICE gear shift stage, a gear shift stage in which the rotational speed change amount of the internal combustion engine accompanying a mode transition is less than or equal to a predetermined threshold value, at the time of a mode transition from the series traveling mode to the parallel traveling mode.

That is, when a mode transition is executed, the rotational speed of the internal combustion engine is switched from a power generation rotational speed for ensuring power generation by the second electric motor (engine rotation speed in the series traveling mode) to a rotational speed that is determined from the transmission ratio of the traveling vehicle speed and the ICE gear shift stage (engine rotation speed in the parallel traveling mode). In the present invention, at this time, a gear shift stage in which the rotational speed change amount of the internal combustion engine accompanying the mode transition is less than or equal to a predetermined threshold value is selected as the ICE gear shift stage. As a result, it is possible to reduce the discomfort that may be imparted to the driver at the time of a mode transition from the series traveling mode to the parallel traveling mode.

BRIEF DESCRIPTION OF THE DRAWINGS

Referring now to the drawings, a mode transition control device for a hybrid vehicle is illustrated.

FIG. 4 is a gear shift pattern table illustrating the gear shift patterns recited in the switching positions of three engagement clutches in a multistage gear transmission mounted in a hybrid vehicle to which is applied the transmission control device of the first embodiment.

DETAILED DESCRIPTION OF THE EMBODIMENTS

Figure 1:
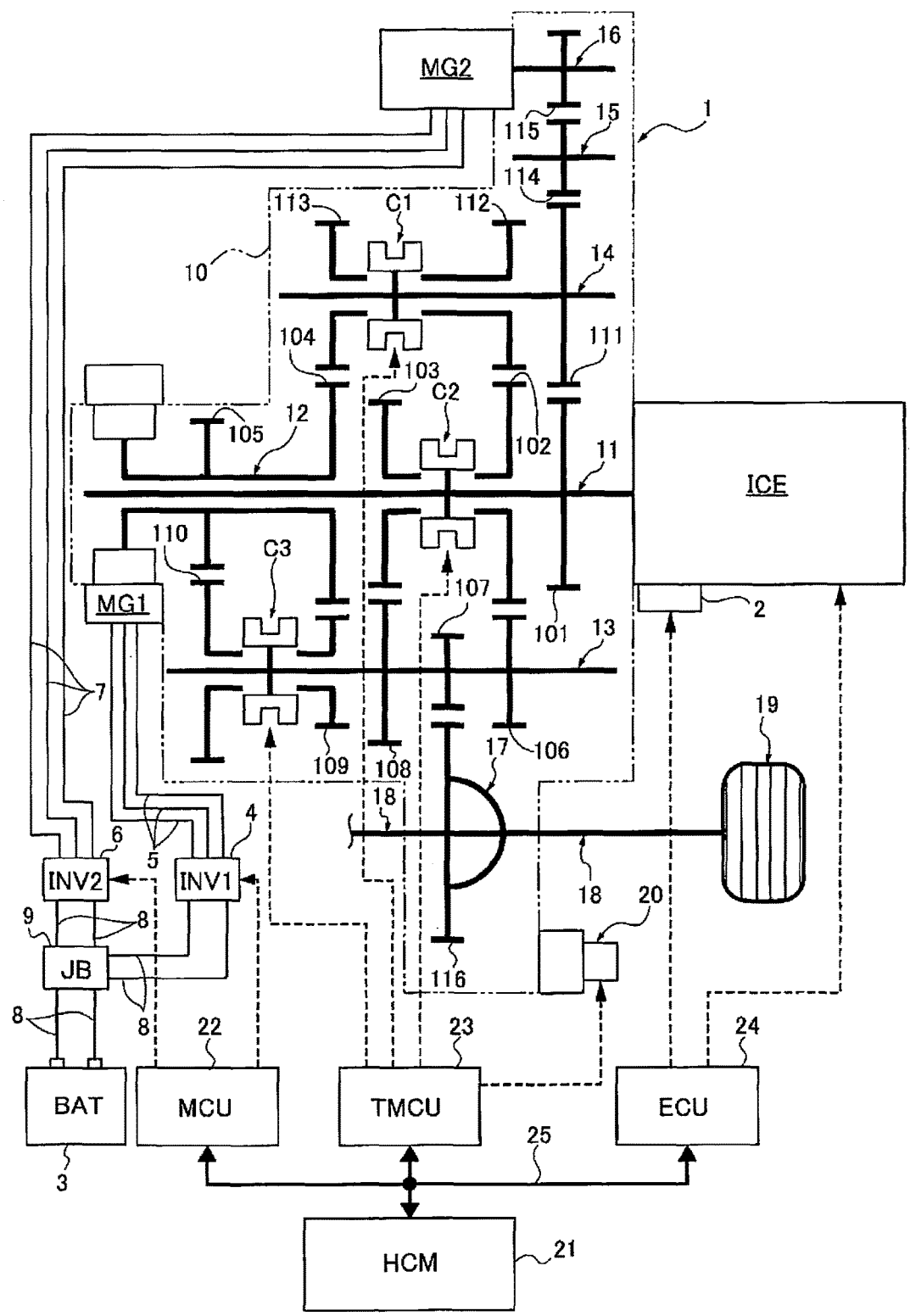
FIG. 1 is an overall system diagram illustrating a drive system and a control system of a hybrid vehicle to which is applied the mode transition control device of the first embodiment.

A preferred embodiment for realizing the mode transition control device for an electrically driven vehicle of the present invention is explained below based on the first embodiment illustrated in the drawings.

First Embodiment

The configuration is described first. The mode transition control device of the first embodiment is applied to a hybrid vehicle (one example of an electrically driven vehicle), comprising, as drive system components, one engine (internal combustion engine), two motor/generators, and a multistage gear transmission having three engagement clutches. The "overall system configuration," the "configuration of the shift control system," the "configuration of the gear shift patterns," and the "configuration of the mode transition control process" will be described separately below with regard to the configuration of the mode transition control device for a hybrid vehicle in the first embodiment.

Overall System Configuration

FIG. 1 illustrates a drive system and a control system of a hybrid vehicle to which is applied the mode transition control device of the first embodiment. The overall system configuration will be described below based on FIG. 1.

The drive system of the hybrid vehicle comprises an internal combustion engine ICE, a first motor/generator MG1 (electric motor), a second motor/generator MG2, and a multistage gear transmission 1 having three engagement clutches C1, C2, C3, as illustrated in FIG. 1. Here, "ICE" is an acronym for "Internal Combustion Engine."

The internal combustion engine ICE is, for example, a gasoline engine or a diesel engine that is disposed in a front area of a vehicle such that the crankshaft direction is aligned with the vehicle width direction. The internal combustion engine ICE is connected to a transmission case 10 of the multistage gear transmission 1, and the output shaft of the internal combustion engine is connected to a first shaft 11 of the multistage gear transmission 1. The internal combustion engine ICE basically carries out an MG2 start, where the second motor/generator MG2 is used as a starter motor. However, a starter motor 2 remains available for when an MG2 start using a high-power battery 3 cannot be ensured, such as during extreme cold.

Both the first motor/generator MG1 and the second motor/generator MG2 are permanent-magnet type synchronous motors utilizing three-phase alternating current, having the high-power battery 3 as a common power source. The stator of the first motor/generator MG1 is fixed to a case of the first motor/generator MG1, and the case is fixed to the transmission case 10 of the multistage gear transmission 1. Then, a first motor shaft integrated with a rotor of the first motor/generator MG1 is connected to a second shaft 12 of the multistage gear transmission 1. The stator of the second motor/generator MG2 is fixed to a case of the second motor/generator MG2, and the case is fixed to the transmission case 10 of the multistage gear transmission 1. Then, a second motor shaft integrated with a rotor of the second motor/generator MG2 is connected to a sixth shaft 16 of the multistage gear transmission 1. A first inverter 4, which converts direct current into three-phase alternating current during powering and converts three-phase alternating current into direct current during regeneration, is connected to a stator coil of the first motor/generator MG1, via a first AC harness 5. A second inverter 6, which converts direct current into three-phase alternating current during powering and converts three-phase alternating current into direct current during regeneration, is connected to a stator coil of the second motor/generator MG2, via a second AC harness 7. The high-power battery 3, the first inverter 4, and the second inverter 6 are connected by a DC harness 8, via a junction box 9.

The multistage gear transmission 1 is a normally meshing transmission comprising a plurality of gear pairs having different transmission ratios, and comprises six gear shafts 11-16 provided with gears and disposed parallel to each other inside the transmission case 10, and three engagement clutches C1, C2, C3 for selecting a gear pair. A first shaft 11, a second shaft 12, a third shaft 13, a fourth shaft 14, a fifth shaft 15, and a sixth shaft 16 are provided as gear shafts. A first engagement clutch C1, a second engagement clutch C2, and a third engagement clutch C3 are provided as engagement clutches. The transmission case 10 is provided with an electric oil pump 20 that supplies lubrication oil to the meshing portions of the gears and the axle bearing portions inside the case.

The first shaft 11 is a shaft to which the internal combustion engine ICE is connected, and a first gear 101, a second gear 102, and a third gear 103 are disposed relative to the first shaft 11, in that order from the right in FIG. 1. The first gear 101 is integrally provided (including integral attachment) to the first shaft 11. The second gear 102 and the third gear 103 are idling gears, in which a boss portion that protrudes in the axial direction is inserted into the outer perimeter of the first shaft 11, and are provided so as to be drivably connectable to the first shaft 11 via the second engagement clutch C2.

The second shaft 12 is a shaft to which the first motor/generator MG1 is connected, and is a cylindrical shaft that is coaxially disposed with the axis aligned with the outer side position of the first shaft 11, and a fourth gear 104 and a fifth gear 105 are disposed relative to the second shaft 12, in that order from the right in FIG. 1. The fourth gear 104 and the fifth gear 105 are integrally provided (including integral attachment) to the second shaft 12.

The third shaft 13 is a shaft disposed on the output side of the multistage gear transmission 1, and a sixth gear 106, a seventh gear 107, an eighth gear 108, a ninth gear 109, and a tenth gear 110 are disposed relative to the third shaft 13, in that order from the right in FIG. 1. The sixth gear 106, the seventh gear 107, and the eighth gear 108 are integrally provided (including integral attachment) to the third shaft 13. The ninth gear 109 and the tenth gear 110 are idling gears, in which a boss portion that protrudes in the axial direction is inserted into the outer perimeter of the third shaft 13, and are provided so as to be drivably connectable to the third shaft 13 via the third engagement clutch C3. Then, the sixth gear 106 meshes with the second gear 102 of the first shaft 11, the seventh gear 107 meshes with a sixteenth gear 116 of a differential gear 17, and the eighth gear 108 meshes with the third gear 103 of the first shaft 11. The ninth gear 109 meshes with the fourth gear 104 of the second shaft 12, and the tenth gear 110 meshes with the fifth gear 105 of the second shaft 12.

The fourth shaft 14 is a shaft in which both ends are supported in the transmission case 10, and an eleventh gear 111, a twelfth gear 112, and a thirteenth gear 113 are disposed relative to the fourth shaft 14, in that order from the right in FIG. 1. The eleventh gear 111 is integrally provided (including integral attachment) to the fourth shaft 14. The twelfth gear 112 and the thirteenth gear 113 are idling gears, in which a boss portion that protrudes in the axial direction is inserted into the outer perimeter of the fourth shaft 14, and are provided so as to be drivably connectable to the fourth shaft 14 via the first engagement clutch C1. Then, the eleventh gear 111 meshes with the first gear 101 of the first shaft 11, the twelfth gear 112 meshes with a second gear 102 of the first shaft 11, and the thirteenth gear 113 meshes with the fourth gear 104 of the second shaft 12.

The fifth shaft 15 is a shaft in which both ends are supported in the transmission case 10, and a fourteenth gear 114 that meshes with the eleventh gear 111 of the fourth shaft 14 is integrally provided thereto (including integral attachment).

The sixth shaft 16 is a shaft to which the second motor/generator MG2 is connected, and a fifteenth gear 115 that meshes with the fourteenth gear 114 of the fifth shaft 15 is integrally provided thereto (including integral attachment).

The second motor/generator MG2 and the internal combustion engine ICE are mechanically connected to each other by a gear train configured from the fifteenth gear 115, the fourteenth gear 114, the eleventh gear 111, and the first gear 101, which mesh with each other. The gear train serves as a reduction gear train that decelerates the MG2 rotation speed at the time of an MG2 start of the internal combustion engine ICE by the second motor/generator MG2, and serves as a speed increasing gear train that accelerates the engine rotation speed at the time of MG2 power generation for generating the second motor/generator MG2, by the driving of the internal combustion engine ICE.

The first engagement clutch C1 is a dog clutch that is interposed between the twelfth gear 112 and the thirteenth gear 113 of the fourth shaft 14, and that is engaged by an engagement stroke in a rotationally synchronized state without possessing a synchronization mechanism. When the first engagement clutch C1 is in a left engagement position (Left), the fourth shaft 14 and the thirteenth gear 113 are drivingly connected. When the first engagement clutch C1 is in a neutral position (N), the fourth shaft 14 and the twelfth gear 112 are released, and the fourth shaft 14 and the thirteenth gear 113 are released. When the first engagement clutch C1 is in a right engagement position (Right), the fourth shaft 14 and the twelfth gear 112 are drivingly connected.

The second engagement clutch C2 is a dog clutch that is interposed between the second gear 102 and the third gear 103 of the first shaft 11, and that is engaged by an engagement stroke in a rotationally synchronized state without possessing a synchronization mechanism. When the second engagement clutch C2 is in a left engagement position (Left), the first shaft 11 and the third gear 103 are drivingly connected. When the second engagement clutch C2 is in a neutral position (N), the first shaft 11 and the second gear 102 are released, and the first shaft 11 and the third gear 103 are released. When the second engagement clutch C2 is in a right engagement position (Right), the first shaft 11 and the second gear 102 are drivingly connected.

The third engagement clutch C3 is a dog clutch that is interposed between the ninth gear 109 and the tenth gear 110 of the third shaft 13, and that is engaged by an engagement stroke in a rotationally synchronized state without possessing a synchronization mechanism. When the third engagement clutch C3 is in a left engagement position (Left), the third shaft 13 and the tenth gear 110 are drivingly connected. When the third engagement clutch C3 is in a neutral position (N), the third shaft 13 and the ninth gear 109 are released, and the third shaft 13 and the tenth gear 110 are released. When the third engagement clutch C3 is in a right engagement position (Right), the third shaft 13 and the ninth gear 109 are drivingly connected. Then, a sixteenth gear 116 that meshes with the seventh gear 107 integrally provided (including integral attachment) to the third shaft 13 of the multistage gear transmission 1 is connected to left and right drive wheels 19 via the differential gear 17 and left and right drive shafts 18.

The control system of the hybrid vehicle comprises a hybrid control module 21, a motor control unit 22, a transmission control unit 23, and an engine control unit 24, as illustrated in FIG. 1.

The hybrid control module 21 (acronym: "HCM") is an integrated control means having a function to appropriately manage the energy consumption of the entire vehicle. This hybrid control module 21 is connected to the other control units (motor control unit 22, transmission control unit 23, engine control unit 24, etc.) so as to be capable of bidirectional information exchange via a CAN communication line 25. The "CAN" in CAN communication line 25 is an acronym for "Controller Area Network."

The motor control unit 22 (acronym: "MCU") carries out powering control, regeneration control, and the like, of the first motor/generator MG1 and the second motor/generator MG2 via control commands to the first inverter 4 and the second inverter 6. The control modes for the first motor/generator MG1 and the second motor/generator MG2 are "torque control" and "rotational speed FB control." In the "torque control," a control is carried out in which the actual motor torque is caused to follow a target motor torque, when a target motor torque to be shared with respect to a target drive force is determined. In the "rotational speed FB control," a control is carried out in which a target motor rotation speed, with which the input-output rotational speeds of the clutch are synchronized, is determined, and an FB torque is output so as to converge the actual motor rotation speed with the target motor rotation speed, when there is a gear shift request to meshing engage any one of the engagement clutches C1, C2, C3 during travel.

The transmission control unit 23 (acronym: "TMCU") carries out a shift control for switching the gear shift pattern of the multistage gear transmission 1, by outputting a current command to electric actuators 31, 32, 33 (refer to FIG. 2), based on predetermined input information. In this shift control, the engagement clutches C1, C2, C3 are selectively meshing-engaged/meshing-disengaged, and a gear pair involved in power transmission is selected from the plurality of pairs of gear pairs. Here, at the time of a gear shift request to engage any one of the released engagement clutches C1, C2, C3, in order to suppress differential rotation speed between the input-output of the clutch to ensure meshing engagement, a rotational speed FB control (rotation synchronization control) of the first motor/generator MG1 or the second motor/generator MG2 is used in combination.

The engine control unit 24 (acronym: "ECU") carries out start control of the internal combustion engine ICE, stop control of the internal combustion engine ICE, fuel cut control, and the like by outputting a control command to the motor control unit 22, spark plugs, fuel injection actuator, or the like, based on predetermined input information.

Configuration of the Shift Control System

The multistage gear transmission 1 according to the first embodiment is characterized in that efficiency is achieved by reducing drag by employing, as shifting elements, engagement clutches C1, C2, C3 (dog clutch) that are meshing engaged. Then, when there is a gear shift request to mesh and engage any one of the engagement clutches C1, C2, C3, the differential rotation speeds of the input-output of the clutch are synchronized with the first motor/generator MG1 (when the engagement clutch C3 is engaged) or the second motor/generator MG2 (when the engagement clutches C1, C2 are engaged), and an engagement stroke is started once the rotational speed falls within a synchronization determination rotational speed range, to realize the gear shift. In addition, when there is a gear shift request to release any one of the engaged engagement clutches C1, C2, C3, the clutch transmission torque of the release clutch is reduced, and a disengagement stroke is started once the torque becomes less than or equal to a release torque determination value, to realize the gear shift. The configuration of the shift control system of the multistage gear transmission 1 is described below based on FIG. 2.

Figure 2:
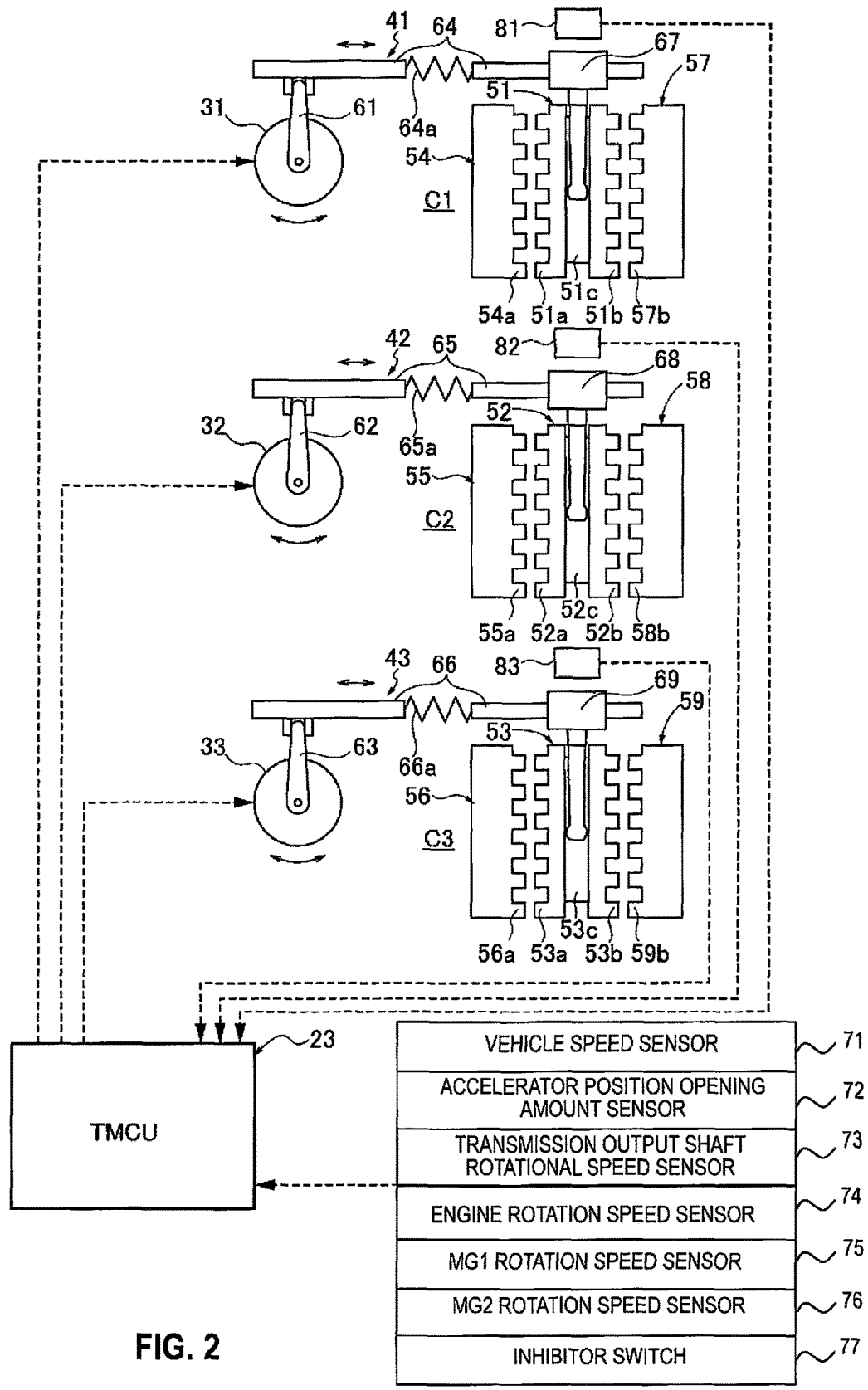
FIG. 2 is a control system block diagram illustrating the configuration of a shift control system of a multistage gear transmission mounted in a hybrid vehicle to which is applied the mode transition control device of the first embodiment.

The shift control system comprises, as engagement clutches, a first engagement clutch C1, a second engagement clutch C2, and a third engagement clutch C3, as illustrated in FIG. 2. A first electric actuator 31, a second electric actuator 32, and a third electric actuator 33 are provided as actuators. A first engagement clutch operating mechanism 41, a second engagement clutch operating mechanism 42, and a third engagement clutch operating mechanism 43 are provided as mechanisms that convert actuator operations into clutch engagement/disengagement operations. Furthermore, a transmission control unit 23 is provided as a control means of the first electric actuator 31, the second electric actuator 32, and the third electric actuator 33.

The first engagement clutch C1, the second engagement clutch C2, and the third engagement clutch C3 are dog clutches that switch between a neutral position (N: disengaged position), a left engagement position (Left: left side clutch meshing-engagement position), and a right engagement position (Right: right side clutch meshing-engagement position). The engagement clutches C1, C2, C3 all have the same configuration, comprising coupling sleeves 51, 52, 53, left dog clutch rings 54, 55, 56, and right dog clutch rings 57, 58, 59. The coupling sleeves 51, 52, 53 are provided so as to be strokable in the axial direction by a spline connection via a hub, which is not shown, fixed to the fourth shaft 14, the first shaft 11, and the third shaft 13, and have dog teeth 51a, 51b, 52a, 52b, 53a, 53b on both sides having flat top surfaces. Furthermore, fork grooves 51c, 52c, 53c are provided relative to the circumferential center portions of the coupling sleeves 51, 52, 53. The left dog clutch rings 54, 55, 56 are fixed to the boss portions of the gears 113, 103, 110, which are left idling gears of the engagement clutches C1, C2, C3, and have dog teeth 54a, 55a, 56a with flat top surfaces that oppose the dog teeth 51a, 52a, 53a. The right dog clutch rings 57, 58, 59 are fixed to the boss portions of the gears 112, 102, 109, which are right idling gears of the engagement clutches C1, C2, C3, and have dog teeth 57b, 58b, 59b with flat top faces that oppose the dog teeth 51b, 52b, 53b.

The first engagement clutch operating mechanism 41, the second engagement clutch operating mechanism 42, and the third engagement clutch operating mechanism 43 are mechanisms for converting the turning motions of the electric actuators 31, 32, 33 into axial stroke motions of the coupling sleeves 51, 52, 53. The engagement clutch operating mechanisms 41, 42, 43 all have the same configuration, comprising turning links 61, 62, 63, shift rods 64, 65, 66, and shift forks 67, 68, 69. One end of each of the turning links 61, 62, 63 is provided relative to the actuator shaft of the electric actuators 31, 32, 33, respectively, and each of the other ends is connected to the shift rods 64, 65, 66, respectively, so as to be relatively displaceable. The shift rods 64, 65, 66 are configured to be capable of expanding and contracting as a function of the magnitude and direction of the rod transmitting force by means of springs 64a, 65a, 66a interposed in the rod dividing positions. One end of each of the shift forks 67, 68, 69 is fixed to the shift rods 64, 65, 66, respectively, and each of the other ends are respectively disposed in the fork grooves 51c, 52c, 53c of the coupling sleeves 51, 52, 53.

The transmission control unit 23 inputs sensor signals and switch signals from a vehicle speed sensor 71, an accelerator position opening amount sensor 72, a transmission output shaft rotation speed sensor 73, an engine rotation speed sensor 74, an MG1 rotation speed sensor 75, an MG2 rotation speed sensor 76, an inhibitor switch 77, and the like. The transmission output shaft rotation speed sensor 73 is provided relative to the shaft end portion of the third shaft 13 and detects the shaft rotation speed of the third shaft 13. Then, a position servo control unit (for example, a position servo system by PID control) is provided, which controls meshing-engagement and disengagement of the engagement clutches C1, C2, C3, determined by the positions of the coupling sleeves 51, 52, 53. The position servo control unit inputs sensor signals from a first sleeve position sensor 81, a second sleeve position sensor 82, and a third sleeve position sensor 83. Then, the sensor values of the sleeve position sensors 81, 82, 83 are read, and current is imparted to the electric actuators 31, 32, 33 such that the positions of the coupling sleeves 51, 52, 53 will be in the disengaged position or the engagement position according to an engagement stroke. That is, by setting an engaged state in which the dog teeth welded to the coupling sleeves 51, 52, 53 and the dog teeth welded to the idling gears are both in engagement positions meshed with each other, the idling gears are drivingly connected to the fourth shaft 14, the first shaft 11, and the third shaft 13. On the other hand, by setting a disengaged state in which the dog teeth welded to the coupling sleeves 51, 52, 53 and the dog teeth welded to the idling gears are in non-engagement positions by displacement of the coupling sleeves 51, 52, 53 in the axial direction, the idling gears are disconnected from the fourth shaft 14, the first shaft 11, and the third shaft 13.

Configuration of the Gear Shift Pattern

The multistage gear transmission 1 of the first embodiment features size reduction achieved by reducing the power transmission loss without a differential rotation absorbing element, such as a fluid coupling, and by reducing ICE gear shift stages (gear shift stages of the internal combustion engine ICE) by providing motor assistance to the internal combustion engine ICE (EV gear shift stages: 1-2 speed, ICE gear shift stages: 1-4 speed). The configuration of the gear shift pattern of the multistage gear transmission 1 is described below based on FIG. 3 and FIG. 4.

Figure 3:
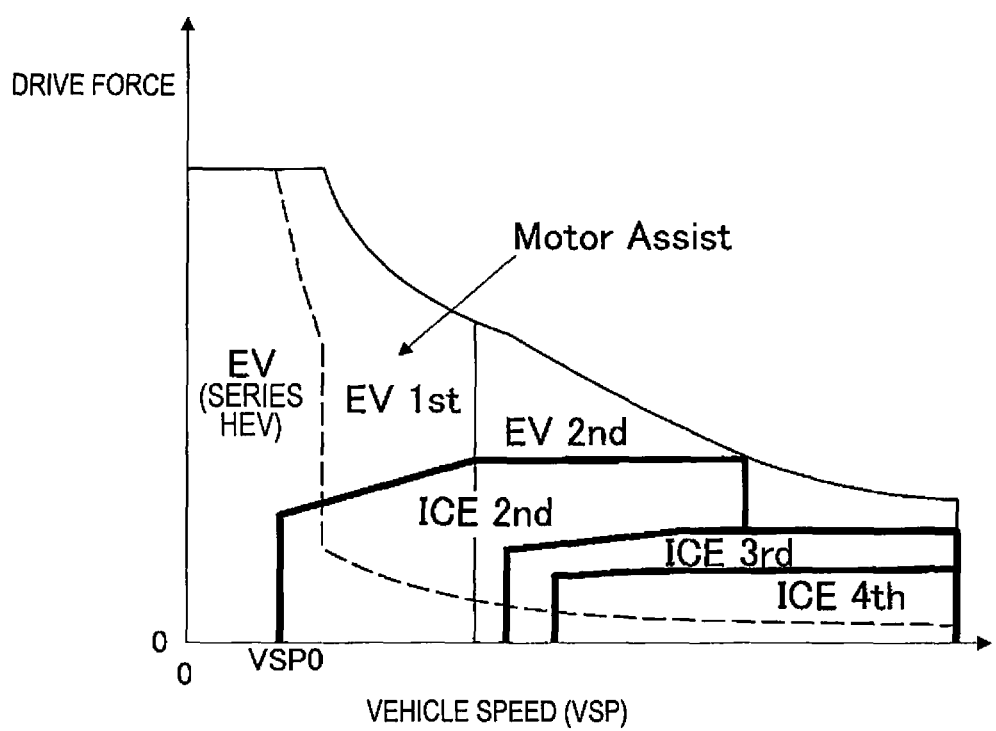
FIG. 3 is a schematic overview of a shift map illustrating a concept of switching the gear shift pattern in a multistage gear transmission mounted on a hybrid vehicle to which is applied the mode transition control device of the first embodiment.

A concept of a gear shift pattern is employed in which, when the vehicle speed VSP is in a starting region that is less than or equal to a predetermined vehicle speed VSP0, since the multistage gear transmission 1 does not have a differential rotation absorbing element, a motor start by only the motor driving force is carried out in the "EV mode," as illustrated in FIG. 3. Then, when in the traveling region and the demand for driving force is great, a "parallel HEV mode (parallel traveling mode)" is employed in which the engine driving force is assisted by the motor driving force, as illustrated in FIG. 3. That is, as the vehicle speed VSP increases, the ICE gear shift stages shift from (ICE1st)→ICE2nd→ICE3rd→ICE4th, and the EV gear shift stages (gear shift stages of the first motor/generator MG1) shift from EV1st→EV2nd. Therefore, based on the concept of the above-described gear shift pattern, a shift map for issuing gear shift requests for switching the gear shift pattern is created. The shift map illustrated in FIG. 3 is created based on fuel efficiency and electrical efficiency and is used in a state in which there is no excess or deficiency in the remaining battery SOC (State of Charge) of the high-power battery 3. In addition, while not shown, the transmission control unit 23 comprises a plurality of shift maps according to the remaining battery SOC (State of Charge) of the high-power battery 3.

The gear shift patterns obtainable by the multistage gear transmission 1 having engagement clutches C1, C2, C3 are as shown in FIG. 4. In FIG. 4, "Lock" represents an interlock pattern that is not applicable as a gear shift pattern, "EV-" represents a state in which the first motor/generator MG1 is not drivingly connected to the driving wheels 19, and "ICE-" represents a state in which the internal combustion engine ICE is not drivingly connected to the driving wheels 19. During the shift control, it is not necessary to use all the gear shift patterns shown in FIG. 4, and it is of course possible to select from these gear shift patterns according to need. Each of the gear shift patterns is described below.

When the second engagement clutch C2 is in "N" and the third engagement clutch C3 is in "N," the following gear shift patterns are obtained according to the position of the first engagement clutch C1. "EV-ICEgen" is obtained if the first engagement clutch C1 is in "Left," "Neutral" is obtained if the first engagement clutch C1 is in "N," and "EV-ICE3rd" is obtained if the first engagement clutch C1 is in "Right." Here, the gear shift pattern "EV-ICEgen" is a pattern selected at the time of MG1 idle power generation, in which power is generated in the first motor/generator MG1 by the internal combustion engine ICE when the vehicle is stopped, or, at the time of double idle power generation, in which MG2 power generation is carried out in addition to MG1 power generation. The gear shift pattern "Neutral" is a pattern selected at the time of MG2 idle power generation, in which power is generated in the second motor/generator MG2 by the internal combustion engine ICE when the vehicle is stopped.

When the second engagement clutch C2 is in "N" and the third engagement clutch C3 is in "Left," the following gear shift patterns are obtained according to the position of the first engagement clutch C1. "EV1st ICE1st" is obtained if the first engagement clutch C1 is in "Left," "EV1st ICE-" is obtained if the first engagement clutch C1 is in "N," and "EV1st ICE3rd" is obtained if the first engagement clutch C1 is in "Right." Here, the gear shift pattern "EV1st ICE-" is an "EV mode" pattern in which the internal combustion engine ICE is stopped and travel is carried out by the first motor/generator MG1, or a "series HEV mode (series traveling mode. Shown as 'Se-HEV' in FIG. 4, etc.)" pattern in which a first-speed EV travel is carried out by the first motor/generator MG1 while power is generated in the second motor/generator MG2 by the internal combustion engine ICE. For example, when traveling while selecting the "series HEV mode" by "EV1st ICE-," the first engagement clutch C1 is switched from "N" to "Left," based on a deceleration due to insufficient driving force. In this case, the vehicle transitions to traveling by the "parallel HEV mode (first speed)" according to the "EV1st ICE1st" gear shift pattern, in which the driving force is secured.

When the second engagement clutch C2 is in "Left" and the third engagement clutch C3 is in "Left," "EV1st ICE2nd" is obtained if the position of the first engagement clutch C1 is in "N." For example, if the driving force requirement is increased during first-speed EV traveling while selecting the "series HEV mode" by "EV1st ICE-," the second engagement clutch C2 is switched from "N" to "Left." In this case, the vehicle transitions to traveling by a "parallel HEV mode" according to the "EV1st ICE2nd" gear shift pattern, in which the driving force is secured.

When the second engagement clutch C2 is in "Left" and the third engagement clutch C3 is in "N," the following gear shift patterns are obtained according to the position of the first engagement clutch C1. "EV1.5 ICE2nd" is obtained if the first engagement clutch C1 is in "Left," and "EV-ICE2nd" is obtained if the first engagement clutch C1 is in "N."

When the second engagement clutch C2 is in "Left" and the third engagement clutch C3 is in "Right," "EV2nd ICE2nd" is obtained if the position of the first engagement clutch C1 is in "N." For example, when traveling in the "parallel HEV mode" while selecting the "EV1st ICE2nd" gear shift pattern, the third engagement clutch C3 is switched from "Left" to "Right" via "N," according to an up-shift request. In this case, the vehicle transitions to traveling by the "parallel HEV mode" according to the "EV2nd ICE2nd" gear shift pattern, in which the EV gear shift stage is set to second speed. For example, when traveling in the "parallel HEV mode" while selecting the "EV2nd ICE4th" gear shift pattern, the second engagement clutch C2 is switched from "Right" to "Left" via "N," according to a downshift request. In this case, the vehicle transitions to traveling by the "parallel HEV mode" according to the "EV2nd ICE2nd" gear shift pattern, in which the ICE gear shift stage is set to second speed.

When the second engagement clutch C2 is in "N" and the third engagement clutch C3 is in "Right," the following gear shift patterns are obtained according to the position of the first engagement clutch C1. "EV2nd ICE3rd" is obtained if the first engagement clutch C1 is in "Left," "EV2nd ICE-" is obtained if the first engagement clutch C1 is in "N," and "EV2nd ICE3rd" is obtained if the first engagement clutch C1 is in "Right." Here, the gear shift pattern "EV2nd ICE-" is an "EV mode" pattern, in which the internal combustion engine ICE is stopped and travel is carried out by the first motor/generator MG1, or a "series HEV mode" pattern, in which a second-speed EV travel is carried out by the first motor/generator MG1 while power is generated in the second motor/generator MG2 by the internal combustion engine ICE. Therefore, for example, when traveling in the "parallel HEV mode" while selecting the "EV2nd ICE2nd" gear shift pattern, the second engagement clutch C2 is switched from "Left" to "N" and the first engagement clutch C1 is switched from "N" to "Right," according to an up-shift request. In this case, the vehicle transitions to traveling by the "parallel HEV mode" according to the "EV2nd ICE3rd" gear shift pattern, in which the ICE gear shift stage is set to third speed.

When the second engagement clutch C2 is in "Right" and the third engagement clutch C3 is in "Right," "EV2nd ICE4th" is obtained if the position of the first engagement clutch C1 is in "N." When the second engagement clutch C2 is in "Right" and the third engagement clutch C3 is in "N," the following gear shift patterns are obtained according to the position of the first engagement clutch C1. "EV2.5

ICE4th" is obtained if the first engagement clutch C1 is in "Left," and "EV-ICE4th" is obtained if the first engagement clutch C1 is in "N."

When the second engagement clutch C2 is in "Right" and the third engagement clutch C3 is in "Left," "EV1st ICE4th" is obtained if the position of the first engagement clutch C1 is in "N."

Configuration of the Mode Transition Control Process

Figure 5:
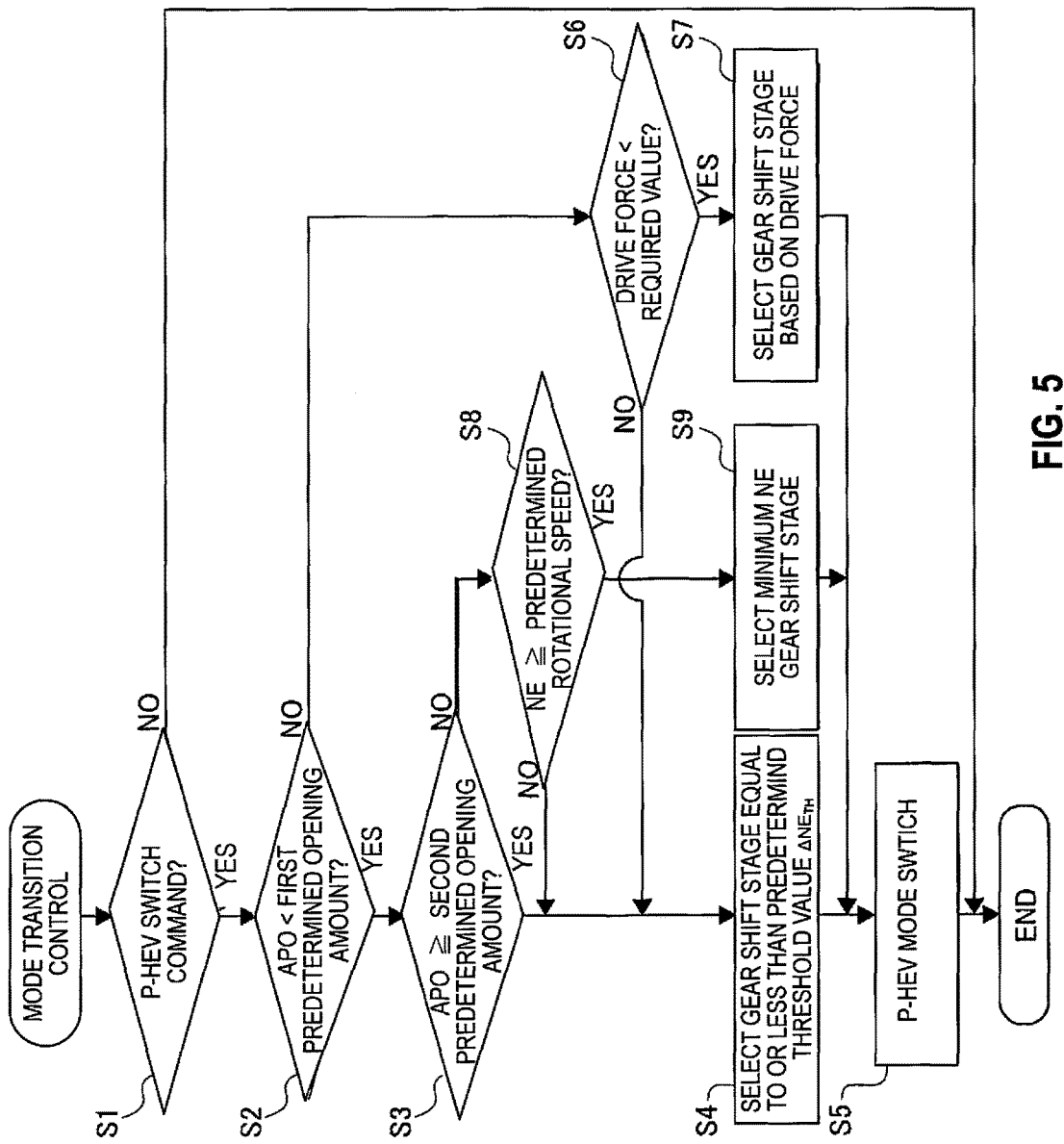
FIG. 5 is a flowchart illustrating the sequence of mode transition control steps carried out in a transmission control unit of the first embodiment.

FIG. 5 illustrates the sequence of the mode transition control steps carried out in the transmission control unit 23 (mode transition controller) of the first embodiment. More specifically, FIG. 5 illustrates the sequence of steps when switching the mode from the series HEV mode (series traveling mode) to the parallel HEV mode (parallel traveling mode. Represented as "P-HEV" in FIG. 5, etc.). Each of the steps in FIG. 5, which shows one example of the configuration of the mode transition control process, will be described below. The steps of FIG. 5 are repeatedly executed while the vehicle is traveling in the series HEV mode.

In Step S1, it is determined whether or not a mode switching command to the parallel HEV mode has been output. A switching command to the parallel HEV mode is output based on the mode switch map illustrated in FIG. 6, using vehicle speed and drive force as parameters.

Figure 6:
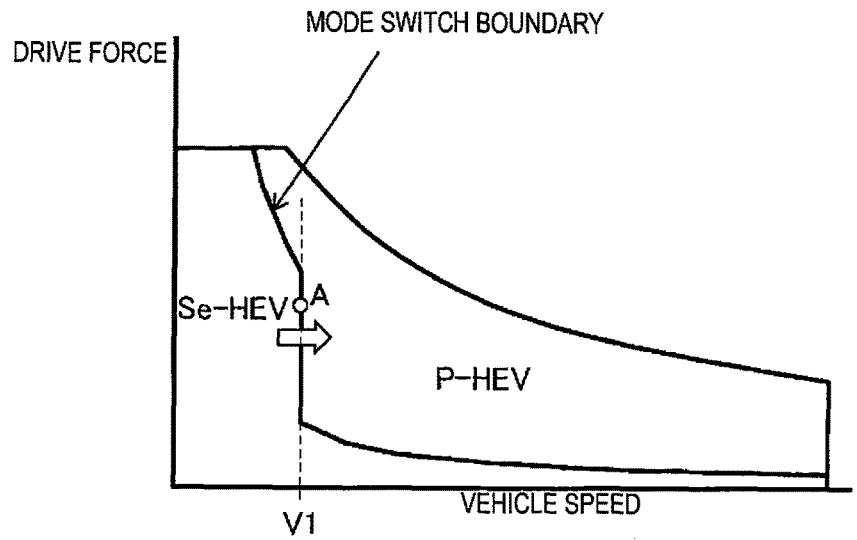
FIG. 6 is a schematic overview of a mode switch map illustrating a concept of the mode transition control process carried out in a transmission control unit of the first embodiment.

That is, if the operating point is on the mode switching boundary line shown in FIG. 6 as the vehicle speed and the drive force change, the mode switching command in Step S1 is output. Here, the mode switching boundary line shown in FIG. 6 is appropriately changed according to the SOC of the high-power battery 3. That is, since it is desirable to use the internal combustion engine ICE as a drive source earlier as the SOC of the high-power battery 3 is lower, the mode switching boundary line is shifted to the lower speed side (left side in the figure).

If the outcome of the determination of Step S1 is YES (switching command to parallel HEV mode present), the process proceeds to Step S2, and it is determined whether or not the accelerator position opening amount APO is less than a first predetermined opening amount. The first predetermined opening amount is set to a value with which it can be determined that the acceleration request for the vehicle by the driver is large, and that the required driving force is high. In other words, it is set to a value with which it can be determined that it is highly necessary to execute a shift control with priority given to the required driving force. The accelerator position opening amount APO can be obtained from an output of an accelerator position opening amount sensor 72. In addition, if the outcome of the determination of Step S1 is NO (switching command to parallel HEV mode absent), the following process is skipped, and the program is ended.

If the outcome of the determination of Step S2 is YES (accelerator position opening amount APO<first predetermined opening amount), the process proceeds to Step S3, and it is determined whether or not the accelerator position opening amount APO is greater than or equal to a second predetermined opening amount, which is set to a value that is smaller than the first predetermined opening amount. The second predetermined opening amount is set to a value with which it can be determined that the vehicle is traveling at a low speed, and that the required driving force is low. In other words, the second predetermined opening amount is set to a value with which it can be determined whether the vehicle is in a traveling region that is likely to impart discomfort to the driver.

If the outcome of the determination of Step S3 is YES (accelerator position opening amount APO≥second predetermined opening amount), then the process proceed to Step S4, and a gear shift stage in which the rotational speed change amount $\Delta NE$ of an internal combustion engine ICE accompanying a mode transition is less than or equal to a predetermined threshold value $\Delta NE_{TH}$, or, more preferably, a gear shift stage in which the rotational speed change amount $\Delta NE$ of the internal combustion engine ICE accompanying a mode transition becomes the smallest, is selected as the ICE gear shift stage after the transition to the parallel HEV mode. That is, the transmission control unit 23 according to the first embodiment selects an ICE gear shift stage using the shift map illustrated in FIG. 3 in normal shifting. However, if transitioning from the series HEV mode to the parallel HEV mode, the transmission control unit 23 selects the ICE gear shift stage based on the rotational speed change amount $\Delta NE$ of the internal combustion engine ICE accompanying the mode transition rather than the shift map illustrated in FIG. 3, which is based on fuel efficiency and electric efficiency.

Figure 7:
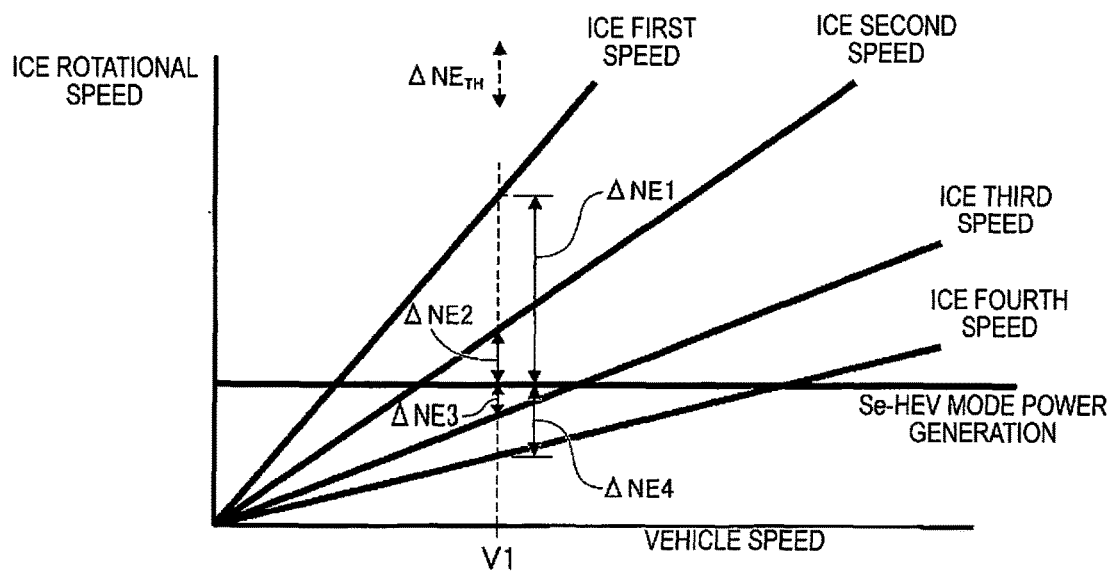
FIG. 7 is a schematic overview of a shift map illustrating how to select an ICE gear shift stage when executing the mode transition control process of the first embodiment.

The selection of the ICE gear shift stage in Step S4 will be described with reference to FIG. 6 and FIG. 7. FIG. 7 is a shift map of the internal combustion engine ICE. In FIG. 6, the case is considered in which the operating point at the time of a mode transition from the series HEV mode to the parallel HEV mode is, for example, operating point A (vehicle speed V1).

The transmission control unit 23 can select ICE first speed, ICE second speed, ICE third speed, and ICE fourth speed as the ICE gear shift stage after transition to the parallel HEV mode, as illustrated in FIG. 7. At the time of a mode transition with the operating point A (vehicle speed V1), if ICE first speed is selected as the ICE gear shift stage after a transition to the parallel HEV mode, the rotational speed change amount of the internal combustion engine ICE becomes $\Delta NE1$. Similarly, if ICE second speed is selected, the rotational speed change amount is $\Delta NE2$; if ICE third speed is selected, the rotational speed change amount is $\Delta NE3$; and if ICE fourth speed is selected, the rotational speed change amount is $\Delta NE4$. Of the foregoing, the gear shift stages that become less than or equal to the predetermined threshold value $\Delta NE_{TH}$ are ICE second speed and ICE third speed, as illustrated in FIG. 7. Therefore, the transmission control unit 23 selects one of ICE second speed and ICE third speed (more preferably ICE third speed, with which the rotational speed change amount $\Delta NE$ of the internal combustion engine ICE becomes the smallest) in Step S4. The predetermined threshold value $\Delta NE_{TH}$ is appropriately set based on discomfort that is imparted to the driver according to the vehicle speed at the time of the mode transition. Specifically, if the vehicle speed is low, since the driver is likely to experience discomfort with respect to a rotational speed change of the internal combustion engine ICE, the predetermined threshold value $\Delta NE_{TH}$ is set to a small value. On the other hand, if the vehicle speed is relatively high, the driver is less likely to experience discomfort with respect to a rotational speed change of the internal combustion engine ICE; therefore, the predetermined threshold value $\Delta NE_{TH}$ can be set to a relatively large value. That is, the predetermined threshold value $\Delta NE_{TH}$ is set according to the vehicle speed to a value that can ensure appropriate sound/vibration performance of the vehicle speed.

When the ICE gear shift stage after a transition to the parallel HEV mode is selected in Step S4, the steps then proceed to Step S5. In Step S5, shifting to the ICE gear shift stage selected in Step S4 is carried out, the traveling mode is switched to the parallel HEV mode, and the program is ended.

On the other hand, in the case of a NO outcome in Step S2 (accelerator position opening amount APO≥first predetermined opening amount), that is, if it is determined that the acceleration request from the driver is high, the process proceeds to Step S6. In Step S6, if the mode is caused to transition to the parallel HEV mode based on the sound/vibration performance, it is determined whether or not the drive force after the mode transition is less than the required driving force that is calculated according to the accelerator position opening amount APO, or the like. That is, upon switching to the parallel HEV mode, if the vehicle is shifted to an ICE gear shift stage with which the rotational speed change amount ΔNE of the internal combustion engine ICE becomes less than or equal to the predetermined threshold value $\Delta NE_{TH}$, it is determined whether or not the drive force will be insufficient. In the example of FIG. 7, as described above, the ICE gear shift stages at which the appropriate sound/vibration performance of the vehicle can be secured are ICE second speed and ICE third speed. Therefore, in Step S6, it is determined whether or not the drive forces that can be realized by ICE second speed or the ICE third speed will both be less than the driving force required for the driver.

If the outcome of the determination of Step S6 is YES (insufficient driving force), the process proceeds to Step S7, and an ICE gear shift stage is selected based on the required driving force. That is, even if the rotational speed change amount ΔNE of the internal combustion engine ICE is greater than or equal to the predetermined threshold value $\Delta NE_{TH}$, an ICE gear shift stage that can satisfy the required driving force is selected. Even if the outcome of the determination of Step S6 is YES and an ICE gear shift stage is selected based on the required driving force, if there is a plurality of gear shift stages from which the selection can be made, the gear shift stage with which the rotational speed change amount ONE of the internal combustion engine ICE becomes smallest is selected.

Next, the process proceeds to Step S5, so that shifting to the ICE gear shift stage selected in Step S7 is carried out and the traveling mode is switched to the parallel HEV mode, after which the program is ended.

Additionally, in the case that the determination of Step S6 is NO (the required driving force is satisfied), the process proceeds to Step S4. When the process proceeds from S6 to S4, an ICE gear shift stage that satisfies the required driving force, as well as an ICE gear shift stage with which the rotational speed change amount ΔNE of the internal combustion engine ICE becomes less than or equal to the predetermined threshold value $\Delta NE_{TH}$ (more preferably the ICE gear shift stage with which the rotational speed change amount ΔNE of the internal combustion engine ICE becomes smallest), is selected. Therefore, in the example shown in FIG. 7, if the drive force is insufficient with ICE third speed but the required driving force can be satisfied with ICE second speed, then the ICE second speed is selected.

In addition, in the case of a NO outcome in Step S3 (accelerator position opening amount APO<second predetermined opening amount), that is, if it is determined that the vehicle is traveling at a low speed and that the required driving force is low, the process proceeds to Step S8. In Step S8, it is determined whether or not the rotational speed NE of the internal combustion engine ICE is greater than or equal to a predetermined rotational speed. The predetermined rotational speed is set in consideration of the sound/vibration performance based on the current vehicle speed and the accelerator position opening amount APO. That is, the predetermined rotational speed is set to a rotational speed that could impart discomfort to the driver, compared with the current vehicle speed and accelerator position opening amount APO.

Figure 8:
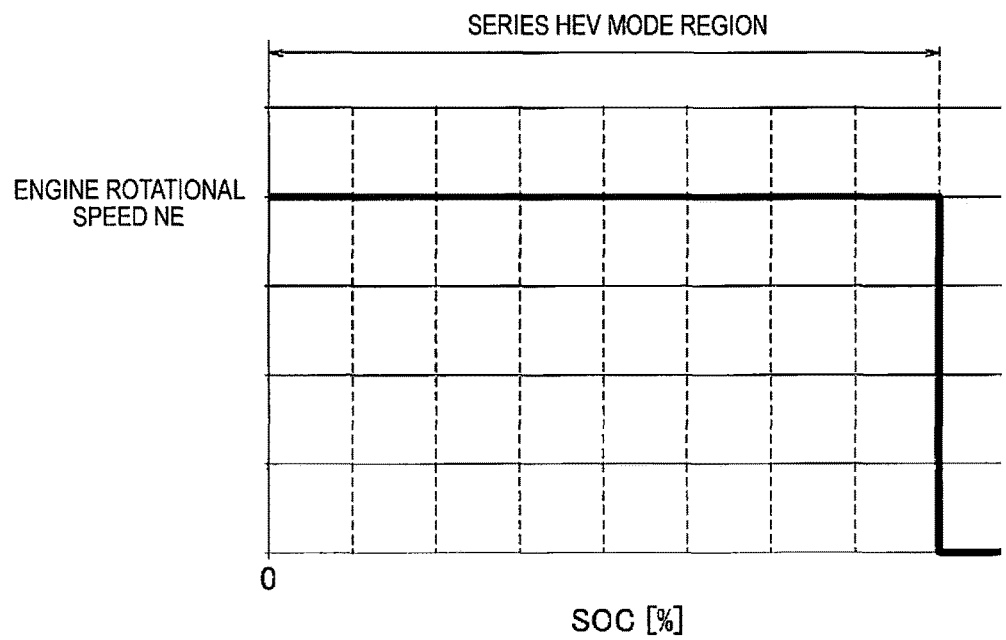
FIG. 8 is an explanatory view illustrating the engine rotation speed during series traveling of a hybrid vehicle to which is applied the mode transition control device of the first embodiment.

FIG. 8 illustrates the engine rotational speed NE in the series HEV mode. As described above, in the series HEV mode, power is generated in the second motor/generator MG2 by the internal combustion engine ICE. Therefore, in the first embodiment, a power generation rotational speed for ensuring power generation by the second motor/generator MG2 is maintained during travel in the series HEV mode. Thus, if low speed travel is carried out in the series HEV mode by the hybrid vehicle according to the first embodiment, there are cases in which the rotational speed NE (power generation rotational speed) of the internal combustion engine ICE becomes higher compared with a target rotational speed that is calculated from the vehicle speed and the accelerator position opening amount APO in a normal vehicle, and discomfort may be imparted to the driver in terms of the sound/vibration performance. Therefore, the predetermined rotational speed of Step S8 is set to a value with which it is possible to determine that the rotational speed NE (power generation rotational speed) of the internal combustion engine ICE in the series HEV mode is high compared with the current state of travel of the vehicle and that discomfort could be imparted to the driver.

In the case of a YES outcome in Step S8 (rotational speed NE of internal combustion engine ICE≥predetermined rotational speed), the process proceeds to Step S9. In Step S9, a gear shift stage with which the rotational speed NE of the internal combustion engine ICE after a transition to the parallel HEV mode becomes smallest (ICE fourth speed in the first embodiment) is selected.

Next, the process proceeds to Step S5, so that shifting to the ICE gear shift stage selected in Step S9 is carried out and the traveling mode is switched to the parallel HEV mode, after which the program is ended. In the case of a NO outcome in Step S8 (rotational speed NE of internal combustion engine ICE<predetermined rotational speed), the process proceeds to Step S4 and the above-described process is carried out.

Next, the actions are described. The "action of the mode transition control process," the "action of the mode transition control," and the "characteristic action of the mode transition control" will be described separately, in terms of the actions of the mode transition control device for a hybrid vehicle according to the first embodiment.

Action of the Mode Transition Control Process

The action of the mode transition control process will be described below based on the flowchart illustrated in FIG. 5.

If a mode switching command to the parallel HEV mode (parallel traveling mode) is output during travel in the series HEV mode (series traveling mode), the process proceeds from Step S1→Step S2 in the flowchart of FIG. 5. If the accelerator position opening amount APO is greater than or equal to the second predetermined opening amount and less than the first predetermined opening amount, the process proceeds from Step S2→Step S3→Step S4, and an ICE gear shift stage, in which the rotational speed change amount ΔNE of the internal combustion engine ICE accompanying the mode transition becomes less than or equal to the predetermined threshold value $\Delta NE_{TH}$ (more preferably, with which the rotational speed change amount ΔNE becomes smallest), is selected. As a result, it is possible to suppress the rotational speed change of the internal combustion engine ICE accompanying a mode switch from the series HEV mode to the parallel HEV mode. Therefore, it is possible to improve the sound/vibration performance accompanying the mode switch and to reduce discomfort that may be imparted to the driver.

In addition, if the accelerator position opening amount APO at the time of outputting the mode switching command is greater than or equal to the first predetermined opening amount (if it is determined that the acceleration request is high), the process proceeds from Step S1→Step S2→Step S6 in the flowchart of FIG. 5. Here, when an ICE gear shift stage is selected based on the sound/vibration performance, if it is determined that the required driving force cannot be satisfied after the mode transition, the process proceeds to Step S7, and an ICE gear shift stage is selected based on the required driving force. As a result, it is possible to prevent insufficient driving force after a mode transition.

In addition, if the accelerator position opening amount APO at the time of outputting the mode switching command is less than the second predetermined opening amount (if it is determined that the vehicle is traveling at a low speed and that the required driving force is low), the process proceeds from Step S1→Step S2→Step S3→Step S8 in the flowchart of FIG. 5. Then, if the engine rotational speed NE is greater than or equal to a predetermined rotational speed (if it is determined that discomfort could be imparted to the driver in terms of the sound/vibration performance), an ICE gear shift stage, with which the engine rotational speed NE after the mode switch becomes the smallest, is selected. As a result, it is possible to reduce discomfort that may be imparted to the driver.

Such actions will be discussed in more detail. As described with reference to FIG. 8, when the vehicle is traveling in the series HEV mode, the rotational speed of the internal combustion engine ICE is constant (power generation rotational speed), regardless of vehicle speed, in order to ensure power generation by the second motor/generator MG2. Consequently, if the vehicle travels at a low speed while in the series HEV mode, the engine rotational speed NE is high relative to the vehicle speed, and the like, so that there is the risk that discomfort will be imparted to the driver. Therefore, in the case described above, at the time of switching to the parallel HEV mode, an ICE gear shift stage with which the engine rotational speed NE becomes the smallest (ICE fourth speed in the first embodiment) is selected, in order to reduce discomfort that may be imparted to the driver.

Action of the Mode Transition Control

Figure 9A:
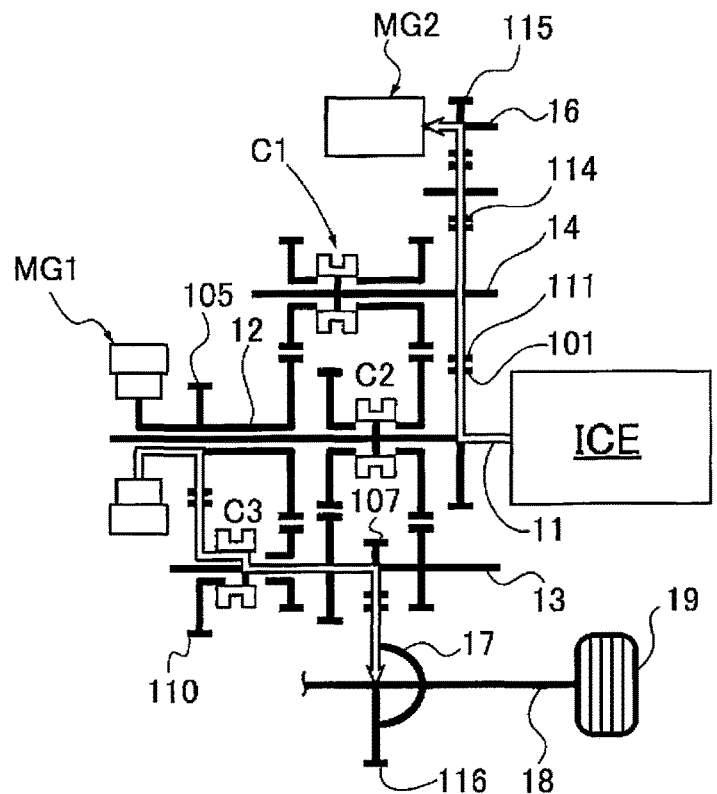
FIG. 9A is a torque flow diagram illustrating the flow of the ICE torque and the MG1 torque in a multistage gear transmission when a gear shift pattern of the series HEV mode is selected.
Figure 9B:
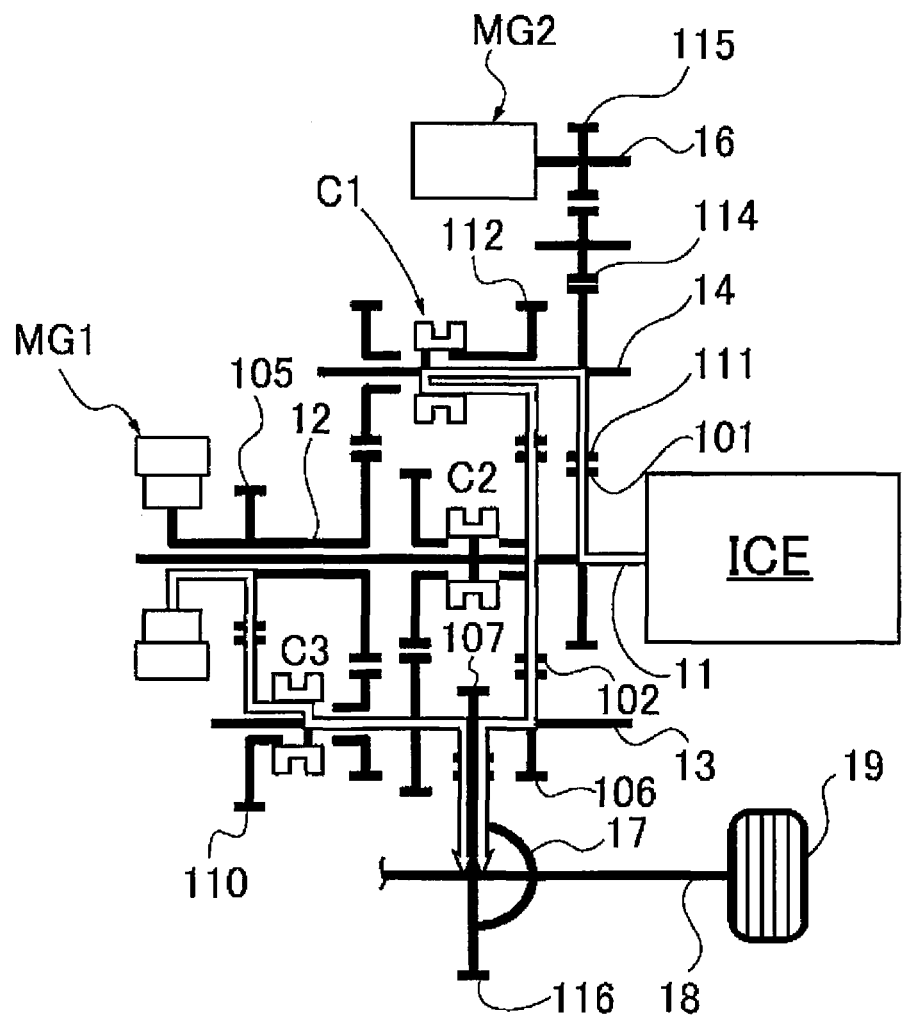
FIG. 9B is a torque flow diagram illustrating the flow of the MG1 torque in a multistage gear transmission when "EV1st ICE3rd" is selected, as one example of a gear shift pattern in the parallel HEV mode.
Figure 10:
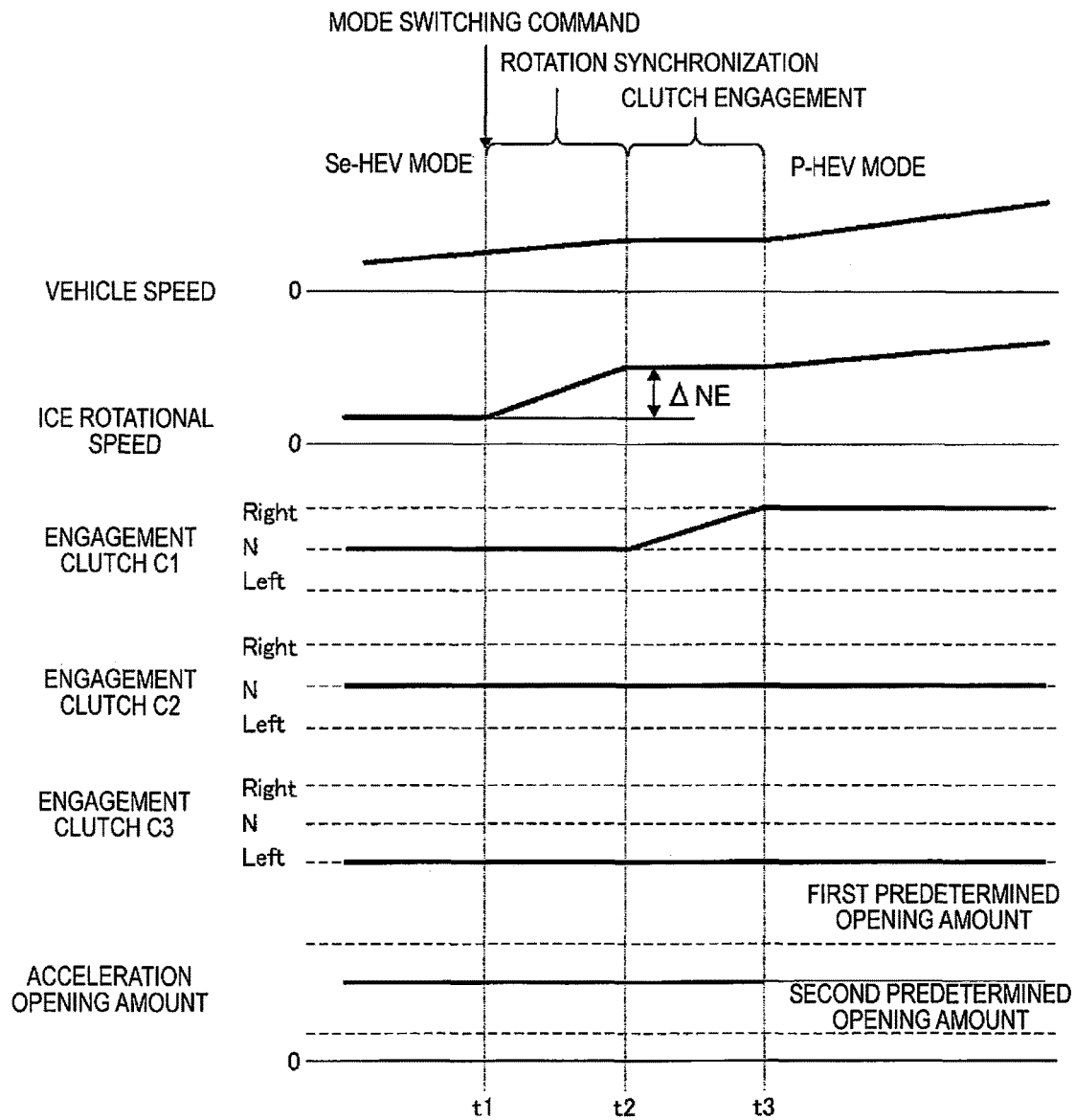
FIG. 10 is a time chart illustrating each characteristic at the time of execution of the flowchart of FIG. 5.

The action of the mode transition control is described below based on FIG. 9A, FIG. 9B, and FIG. 10.

First, the flow of the ICE torque and the MG1 torque in a multistage gear transmission gear 1 when the shift pattern of the series HEV mode (that is, "EV1st ICE-") is selected will be described based on FIG. 9A.

In the "EV1st ICE-" gear shift pattern, the first engagement clutch C1 is in the "N" position, the second engagement clutch C2 is in the "N" position, and the third engagement clutch C3 is in the "Left" position. Therefore, the MG1 torque flows from the first motor/generator MG1 to the second shaft 12→the fifth gear 105→the tenth gear 110→the third shaft 13→the seventh gear 107→the sixteenth gear 116→the differential gear 17→the drive shaft 18→the driving wheels 19. In addition, the ICE torque flows from the internal combustion engine ICE to the first shaft 11→first gear 101→eleventh gear 111→fourteenth gear 114→fifteenth gear 115→sixth shaft 16→second motor/generator MG2, and power generation is carried out by the second motor/generator MG2.

Next, the flow of the ICE torque and the MG1 torque in a multistage gear transmission gear 1 when the mode is switched from the series HEV mode to the parallel HEV mode will be described based on FIG. 9B. FIG. 9B illustrates a case in which "EV1st ICE3rd" is selected as the gear shift pattern after a transition to the parallel HEV mode.

In the "EV1st ICE3rd" gear shift pattern, the first engagement clutch C1 is in the "Right" position, the second engagement clutch C2 is in the "N" position, and the third engagement clutch C3 is in the "Left" position. Therefore, the MG1 torque flows in the same manner as the case of FIG. 9A described above. On the other hand, the ICE torque flows from the internal combustion engine ICE to the first shaft 11→first gear 101→eleventh gear 111→fourth shaft 14→twelfth gear 112→second gear 102→sixth gear 106→third shaft 13→seventh gear 107→sixteenth gear 116→differential gear 17→drive shaft 18→drive wheels 19.

Therefore, a mode switch from "EV1st ICE-" (series HEV mode) to "EV1st ICE3rd" (parallel HEV mode) is achieved by stroking the coupling sleeve 51 of the first engagement clutch C1 from the "N" engagement position to the "Right" engagement position. At this time, the second engagement clutch C2 is kept in the "N" position, and the third engagement clutch C3 is kept in the "Left" position.

The action of the mode transition control described above will be described with reference to the time chart of FIG. 10.

During travel in the series HEV mode, if the operating point is on the mode switching boundary line illustrated in FIG. 6 as the vehicle speed increases, a mode switching command is output at time t1. Since the accelerator position opening amount APO at this point in time is greater than or equal to the second predetermined opening amount and less than the first predetermined opening amount, the transmission control unit 23 selects a gear shift stage in which the rotational speed change amount ΔNE of the internal combustion engine ICE accompanying the mode transition becomes the smallest (ICE third speed in the case of the example shown in FIG. 7) as the ICE gear shift stage after the mode switch.

As described with reference to FIG. 9A and FIG. 9B, shifting from the series HEV mode to the ICE third speed (EV1st ICE3rd) is carried out by switching the first engagement clutch C1 from the "N" position to the "Right" position. Additionally, for meshing engagement of the first engagement clutch C1 to the "Right" position, it is necessary to synchronize the input and output rotation speeds of the first engagement clutch C1 (more accurately, the rotational speed of the coupling sleeve 51 of the first engagement clutch C1 and the rotational speed of the twelfth gear 112). Therefore, the transmission control unit 23 executes a rotational speed FB control of the second motor/generator MG2 and also raises the rotational speed NE of the internal combustion engine ICE to the rotational speed after transition to the parallel mode.

When the input and output rotation speeds of the first engagement clutch C1 are synchronized at time t2, the transmission control unit 23 causes the coupling sleeve 51 of the first engagement clutch C1 to stroke to the "Right"

engagement position. When the coupling sleeve 51 of the first engagement clutch C1 strokes to the "Right" position at time t3, clutch engagement is completed and travel in the parallel HEV mode is started.

Characteristic Action of the Mode Transition Control

As described above, the first embodiment is configured such that a gear shift stage, in which the rotational speed change amount $\Delta NE$ of the internal combustion engine ICE accompanying a mode transition is less than or equal to a predetermined threshold value $\Delta NE_TH$, is selected as the ICE gear shift stage, at the time of a mode transition from the series HEV traveling mode to the parallel HEV traveling mode. That is, upon switching from the series HEV mode to the parallel HEV mode, if the rotational speed change amount $\Delta NE$ of the internal combustion engine ICE is large, there is the risk of imparting discomfort to the driver in terms of the sound/vibration performance. Therefore, the first embodiment is configured to select an ICE gear shift stage, in which the rotational speed change amount $\Delta NE$ of the internal combustion engine ICE accompanying a mode transition is less than or equal to a predetermined threshold value $\Delta NE_{TH}$, as the ICE gear shift stage after transition to the parallel HEV mode. Therefore, it is possible to reduce discomfort that may be imparted to the driver at the time of a mode transition.

The first embodiment is configured such that, if the ICE gear shift stage can be selected from a plurality of gear shift stages, an ICE gear shift stage is selected giving priority to the rotational speed change amount $\Delta NE$ of the internal combustion engine ICE over fuel efficiency. That is, in a conventional mode transition control, the ICE gear shift stage after mode transition is selected based on a map created based on fuel efficiency and electric efficiency (FIG. 3, etc.). For example, when giving consideration to combustion efficiency of the internal combustion engine ICE, there are cases in which it is preferable to select a gear shift stage at which the ICE rotational speed NE becomes high as the ICE gear shift stage after a mode transition. However, if an ICE gear shift stage is selected based solely on efficiency of the internal combustion engine ICE, the rotational speed change amount $\Delta NE$ of the internal combustion engine ICE will be large, and there is the risk of imparting discomfort to the driver. In contrast, the present embodiment is configured to establish a parallel HEV mode by shifting to an ICE gear shift stage based on the rotational speed change amount $\Delta NE$ of the internal combustion engine ICE, rather than a map created based on fuel efficiency, etc., (FIG. 3, etc.) upon selecting an ICE gear shift stage at the time of a mode transition. Therefore, it is possible to reduce discomfort that may be imparted to the driver at the time of a mode transition.

The first embodiment is configured such that if the ICE gear shift stage can be selected from a plurality of gear shift stages, the gear shift stage with which the rotational speed change amount $\Delta NE$ of the internal combustion engine ICE becomes the smallest is selected. That is, if there is a plurality of ICE gear shift stages with which the rotational speed change amount $\Delta NE$ of the internal combustion engine ICE accompanying a mode transition becomes less than or equal to the predetermined threshold value $\Delta NE_{TH}$, a parallel HEV mode is established by shifting to the gear shift stage with which the rotational speed change amount $\Delta NE$ becomes smallest. Therefore, it is possible to further reduce discomfort that may be imparted to the driver at the time of a mode transition.

The first embodiment is configured to select a gear shift stage that satisfies a required driving force if the drive force after a mode transition to the parallel HEV mode becomes less than the required driving force. That is, in cases in which the required driving force from the driver is high, if a gear shift stage is selected with which the rotational speed change amount $\Delta NE$ of the internal combustion engine ICE accompanying a mode transition becomes less than or equal to the predetermined threshold value $\Delta NE_{TH}$, cases in which the drive force will be insufficient are conceivable. Therefore, the first embodiment is configured to establish a parallel HEV mode by shifting to a gear shift stage that satisfies a required driving force regardless of an excessive rotational speed change amount $\Delta NE$ of the internal combustion engine ICE, if it is determined that the drive force after a mode transition is less than the required driving force. Therefore, it is possible to avoid insufficient driving force after the mode transition.

The first embodiment is configured to select an ICE gear shift stage based on the rotational speed change amount $\Delta NE$ of the internal combustion engine ICE when the accelerator position opening amount APO is less than a first predetermined opening amount, and to select an ICE gear shift stage based on the required driving force when the accelerator position opening amount APO is greater than or equal to the first predetermined opening amount. That is, if it can be determined that the amount of required driving force from the driver is not large, it is made possible to reduce discomfort that may be imparted to the driver in terms of the sound/vibration performance based on the rotational speed change amount $\Delta NE$ of the internal combustion engine ICE. On the other hand, if it can be determined that the required driving force from the driver is large, an ICE gear shift stage that satisfies the required driving force is selected. Therefore, it is possible to reduce the discomfort to the driver that may accompany a mode transition if there is less than a predetermined required driving force, and it is possible to avoid an insufficient driving force when the driving force is greater than or equal to the predetermined required driving force.

The first embodiment is configured so that a gear shift stage as the ICE gear shift stage can be selected for which the rotational speed NE of the internal combustion engine ICE is lowest, when the accelerator position opening amount APO is less than a second predetermined opening amount, which is smaller than the first predetermined opening amount. That is, discomfort is likely to be imparted to the driver if the vehicle is traveling at a low speed and the required driving force is low. Therefore, the first embodiment is configured to select a gear shift stage in which the rotational speed NE of the internal combustion engine ICE after a mode transition becomes the lowest (ICE fourth speed in the first embodiment), when the accelerator position opening amount APO is less than the second predetermined opening amount. More specifically, as described with reference to FIG. 8, when the vehicle is traveling in the series HEV mode, the rotational speed NE of the internal combustion engine ICE is held constant (power generation rotational speed) regardless of the vehicle speed, in order to carry out power generation control by the second motor/generator MG2. Consequently, if the driver does not desire power generation by the second motor/generator MG2, there is the risk that the driver will experience discomfort with respect to the rotational speed of the internal combustion engine ICE. In particular, if the vehicle is traveling at a low speed, the driver is likely to experience discomfort due to the rotational speed NE of the internal combustion engine ICE (more accurately, duet to the sound and vibration emitted from the internal combustion engine ICE). Therefore, the first embodiment is configured to establish a parallel HEV mode by shifting to a gear shift stage that generates the least amount of sound and vibration, that is, a gear shift stage with which the rotational speed NE of the internal combustion engine ICE becomes lowest, if it is determined that the vehicle is traveling at a low speed and that the required driving force is low. Therefore, by carrying out a mode transition control during low speed travel, it is possible to reduce discomfort that may be imparted to the driver relative to before the mode transition.

Next, the effects are described. The effects listed below can be obtained by the mode transition control device for a hybrid vehicle according to the first embodiment.

(1) In a hybrid vehicle comprising a first electric motor (the first motor/generator MG1), a second electric motor (the second motor/generator MG2), and an internal combustion engine ICE as drive sources, and having a transmission (multistage gear transmission 1) that is configured to shift and transmit an output from the power sources (the first and second motor/generators MG1, MG2, the internal combustion engine ICE) to a drive wheel 19, where the transmission (multistage gear transmission 1) makes possible a mode transition between a series traveling mode (series HEV mode), in which the drive wheel 19 are driven by the first electric motor (first motor/generator MG1) while generating power with the second electric motor (second motor/generator MG2) by a driving force from the internal combustion engine ICE, and a parallel traveling mode (parallel HEV mode), in which the drive wheel 19 is driven by both the first electric motor (first motor/generator MG1) and the internal combustion engine ICE, a mode transition controller (transmission control unit 23) is provided for switching an ICE gear shift stage that shifts the output of the internal combustion engine ICE if there is a mode transition request, where the mode transition controller (transmission control unit 23) selects, as the ICE gear shift stage, a gear shift stage in which a rotational speed change amount $\Delta NE$ of the internal combustion engine ICE accompanying a mode transition is less than or equal to a predetermined threshold value $\Delta NE_{TH}$, at the time of a mode transition from the series traveling mode to the parallel traveling mode. Thus, it is possible to reduce the discomfort that may be imparted to the driver at the time of a mode transition from the series HEV traveling mode to the parallel HEV traveling mode.

(2) The mode transition controller (transmission control unit 23) selects the ICE gear shift stage giving priority to the rotational speed change amount $\Delta NE$ of the internal combustion engine ICE over fuel efficiency, if the ICE gear shift stage can be selected from a plurality of gear shift stages. Thus, it is possible to reduce discomfort that may be imparted to the driver at the time of a mode transition to the parallel HEV mode.

(3) The mode transition controller (transmission control unit 23) selects a gear shift stage with which the rotational speed change amount $\Delta NE$ of the internal combustion engine ICE becomes the smallest, if the ICE gear shift stage can be selected from a plurality of gear shift stages. Thus, in addition to the effect of (1) or (2), it is possible to further reduce the discomfort that may be imparted to the driver at the time of a mode transition to the parallel HEV mode.

(4) The mode transition controller (transmission control unit 23) selects a gear shift stage that satisfies a required driving force, if the drive force after a mode transition to the parallel traveling mode (parallel HEV mode) becomes less than the required driving force. Thus, in addition to the effects of (1) to (3), it is possible to avoid insufficient driving force after a mode transition to the parallel HEV mode.

(5) The mode transition controller (transmission control unit 23) selects a the ICE gear shift stage based on the rotational speed change amount $\Delta NE$ of the internal combustion engine ICE when an accelerator position opening amount APO is less than a first predetermined opening amount, and selects the ICE gear shift stage based on the required driving force when the accelerator position opening amount APO is greater than or equal to the first predetermined opening amount. Thus, in addition to the effects of (1) to (4), it is possible to reduce the discomfort to the driver that may accompany a mode transition if there is less than a predetermined required driving force, and it is possible to avoid an insufficient driving force and it is possible to avoid an insufficient driving force when the driving force is greater than or equal to the predetermined required driving force.

(6) The mode transition controller (transmission control unit 23) selects a gear shift stage in which a rotational speed NE of the internal combustion engine ICE becomes the lowest as the ICE gear shift stage, when the accelerator position opening amount APO is less than a second predetermined opening amount, which is smaller than the first predetermined opening amount. Thus, in addition to the effects of (1) to (5), by carrying out a mode transition control during low speed traveling, it is possible to reduce discomfort that may be imparted to the driver relative to before the mode transition.

Second Embodiment

The second embodiment is an example in which the value of the predetermined threshold value $\Delta NE_{TH}$ upon the selection of an ICE gear shift stage after a transition to the parallel HEV mode is changed according to various parameters, in the mode transition control device for an electrically driven vehicle of the present invention.

Specifically, a predetermined threshold value $\Delta NE_{THP}$, with respect to when the rotational speed NE of the internal combustion engine ICE accompanying a mode transition increases, is set to a value that is smaller than a predetermined threshold value $\Delta NE_{THM}$, with respect to when the rotational speed NE of the internal combustion engine ICE accompanying a mode transition decreases. Here, the reason that the threshold value (predetermined threshold value $\Delta NE_{THM}$) with respect to when the rotational speed NE of the internal combustion engine ICE decreases is increased (the permissible range is expanded) is because, normally, if a shift control (upshift) is carried out as the vehicle speed increases, the rotational speed of the internal combustion engine ICE is reduced. That is, if the ICE gear shift stage is increased due to an upshift, the rotational speed NE of the internal combustion engine ICE is generally reduced. Therefore, a driver is not likely to experience discomfort with respect to a decrease in the rotational speed NE of the internal combustion engine ICE accompanying a mode transition. On the other hand, a driver is likely to experience discomfort with respect to an increase in the rotational speed NE of the internal combustion engine ICE, despite the fact that the vehicle speed was increased and a shift control (mode transition control) was carried out. Therefore, in the second embodiment, a predetermined threshold value $\Delta NE_{THP}$, with respect to when the rotational speed NE of the internal combustion engine ICE accompanying a mode transition increases, is set to a value that is smaller than a predetermined threshold value $\Delta NE_{THM}$, with respect to when the rotational speed NE decreases.

Figure 11:
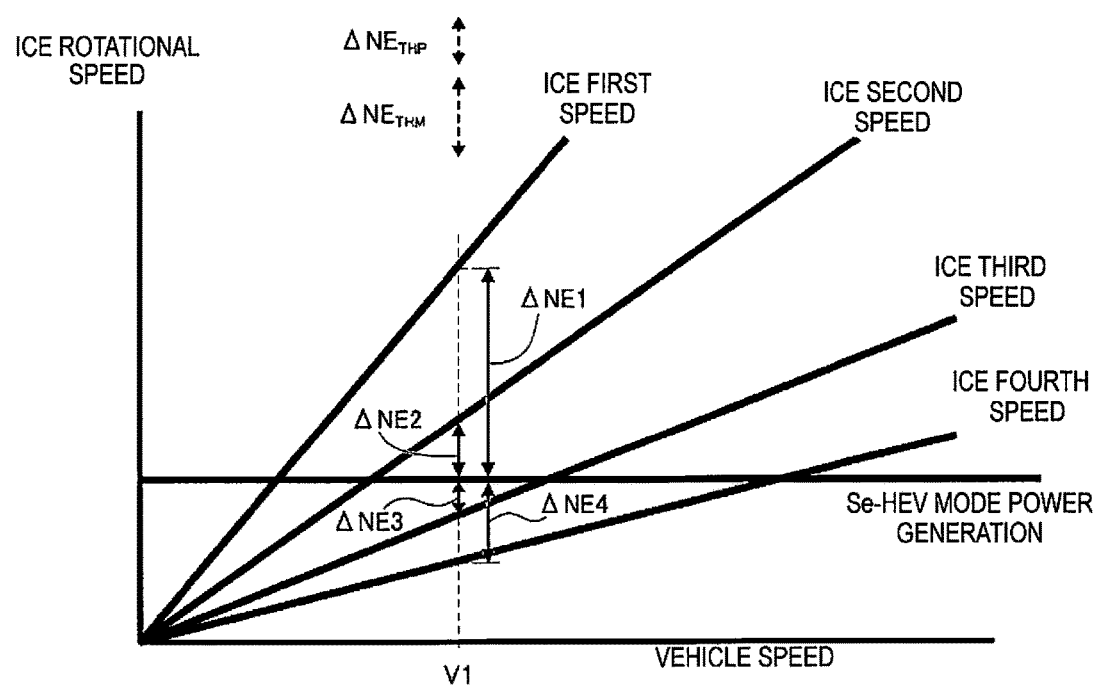
FIG. 11 is a schematic overview of a shift map illustrating how to select an ICE gear shift stage when executing the mode transition control process of the second embodiment.

FIG. 11 is an example of a shift control map for explaining how to select an ICE gear shift stage in the second embodiment. In FIG. 11, in the case of a mode transition at vehicle speed V1, if ICE first speed or ICE second speed is selected as the ICE gear shift stage, the rotational speed NE of the internal combustion engine ICE increases compared with before the mode transition. On the other hand, if ICE third speed or ICE fourth speed is selected as the ICE gear shift stage, the rotational speed NE of the internal combustion engine ICE decreases compared with before the mode transition. In such a case, the rotational speed change amounts $\Delta NE3$, $\Delta NE4$ accompanying a mode transition, when ICE third speed or the ICE fourth speed is selected, will be less than or equal to the predetermined threshold value $\Delta NE_{THM}$ on the decreasing side of the rotational speed of the internal combustion engine ICE. Therefore, the transmission control unit 23 is able to select either of the ICE third speed and the ICE fourth speed as the ICE gear shift stage after the mode transition. On the other hand, the rotational speed change amounts $\Delta NE1$, $\Delta NE2$ accompanying a mode transition, when ICE first speed or the ICE second speed is selected, will both exceed the predetermined threshold value $\Delta NE_{THP}$ on the increasing side of the rotational speed of the internal combustion engine ICE. Therefore, the transmission control unit 23 cannot select either the ICE first speed or the ICE second speed as the ICE gear shift stage after the mode transition. That is, if only the rotational speed change amounts $\Delta NE$ of the internal combustion engine ICE accompanying a mode transition are compared, the rotational speed change amount $\Delta NE$ will be smaller when selecting ICE second speed compared with when selecting ICE fourth speed; however, in the second embodiment, ICE second speed is not selected, and ICE third speed or the ICE fourth speed (more preferably, ICE third speed with which the rotational speed change amount $\Delta NE$ of the internal combustion engine ICE becomes the smallest) is selected.

In addition, while not shown, in the second embodiment, the values of said predetermined threshold values $\Delta NE_{THP}$, $\Delta NE_{THM}$ are set to be larger as the accelerator position opening amount APO is increased. Here, the reason for setting the values of said predetermined threshold values $\Delta NE_{THP}$, $\Delta NE_{THM}$ to be larger as the accelerator position opening amount APO is increased is because if the driver is greatly depressing the accelerator pedal, the driver will not undergo much discomfort even if the rotational speed NE of the internal combustion engine ICE varies significantly.

The effects listed below can be obtained by the mode transition control device for a hybrid vehicle according to the second embodiment.

(7) The mode transition controller (transmission control unit 23) sets the predetermined threshold value $\Delta NE_{TH}$ ($\Delta NE_{THP}$), with respect to when the rotational speed NE of the internal combustion engine ICE increases, to a value that is smaller than the predetermined threshold value $\Delta NE_{TH}$ ($\Delta NE_{THM}$) with respect to when the rotational speed of the internal combustion engine decreases. Therefore, it is possible to select an ICE gear shift stage after a mode transition giving consideration more specifically to the discomfort that may be imparted to the driver.

(8) The mode transition controller (transmission control unit 23) sets the values of the predetermined threshold values $\Delta NE_{THP}$, $\Delta NE_{THM}$ to be larger as the accelerator position opening amount APO is increased. Therefore, it is possible to select the ICE gear shift stage after a mode transition according to the accelerator operation of the driver, and to further reduce discomfort that may be imparted to the driver.

The mode transition control device for a hybrid vehicle of the present invention was described above based on the first and second embodiments, but specific configurations thereof are not limited to the first and second embodiments, and various modifications and additions to the present invention can be made without departing from the scope of the invention according to each claim in the Claims.

In the first and second embodiments, examples were shown in which were applied a multistage gear transmission 1 comprising EV first to second speeds as EV gear shift stages, and ICE first to fourth speeds as ICE gear shift stages. However, the mode transition control device for a hybrid vehicle of the present invention is not limited to the configuration of the multistage gear transmission of the embodiments.

In the first embodiment, an example was shown in which the mode transition control device of the present invention is applied to a hybrid vehicle comprising, as drive system components, one engine (internal combustion engine), two motor/generators, and a multistage gear transmission having three engagement clutches. However, the mode transition control device of the present invention can be applied to a vehicle having only an engine as a drive source.

The invention claimed is:

1. A mode transition control device for a hybrid vehicle having a first electric motor, a second electric motor and an internal combustion engine as drive sources, and having a transmission that is configured to shift and transmit an output from the drive sources to a drive wheel, the transmission being configured to make a mode transition between a series traveling mode, in which the drive wheel is driven by the first electric motor while generating power with the second electric motor by a drive of the internal combustion engine, and a parallel traveling mode, in which the drive wheel is driven by both the first electric motor and the internal combustion engine, and comprising:

a mode transition controller that switches an ICE gear shift stage that shifts the output of the internal combustion engine upon existence of a request for the mode transition, the mode transition controller selecting the ICE gear shift stage based on a rotational speed change amount of the internal combustion engine accompanying a mode transition, and the ICE gear shift stage in which the rotational speed change amount of the internal combustion engine accompanying the mode transition is less than or equal to a predetermined threshold value at a time of the mode transition from the series traveling mode to the parallel traveling mode.

2. The mode transition control device as recited in claim 1, wherein the mode transition controller selects the ICE gear shift stage while giving priority to the rotational speed change amount of the internal combustion engine over fuel efficiency, if the ICE gear shift stage can be selected from a plurality of ICE gear shift stages.

3. The mode transition control device as recited in claim 2, wherein the mode transition controller selects the ICE gear shift stage with which the rotational speed change amount of the internal combustion engine becomes the smallest, if the ICE gear shift stage can be selected from the plurality of ICE gear shift stages.

4. The mode transition control device as recited in claim 2, wherein
the mode transition controller selects the ICE gear shift stage that satisfies a required driving force, if the drive force after a mode transition to the parallel traveling mode becomes less than the required driving force.

5. The mode transition control device as recited in claim 2, wherein
the mode transition controller selects the ICE gear shift stage based on the rotational speed change amount of the internal combustion engine when an accelerator position opening amount is less than a first predetermined opening amount, and selects the ICE gear shift stage based on a required driving force when the accelerator position opening amount is greater than or equal to the first predetermined opening amount.

6. The mode transition control device as recited in claim 5, wherein
the mode transition controller selects the ICE gear shift stage in which a rotational speed of the internal combustion engine becomes the lowest as the ICE gear shift stage, when the accelerator position opening amount is less than a second predetermined opening amount, which is smaller than the first predetermined opening amount.

7. The mode transition control device as recited in claim 2, wherein
the mode transition controller sets the predetermined threshold value, with respect to when the rotational speed of the internal combustion engine increases, to a value that is smaller than the predetermined threshold value of when the rotational speed of the internal combustion engine decreases.

8. The mode transition control device as recited in claim 2, wherein
the mode transition controller sets the values of the predetermined threshold values to be larger as the accelerator position opening amount is increased.

9. The mode transition control device as recited in claim 1, wherein
the mode transition controller selects the ICE gear shift stage with which the rotational speed change amount of the internal combustion engine becomes the smallest, if the ICE gear shift stage can be selected from a plurality of ME gear shift stages.

10. The mode transition control device as recited in claim 1, wherein
the mode transition controller selects the ICE gear shift stage that satisfies a required driving force, if the drive force after a mode transition to the parallel traveling mode becomes less than the required driving force.

11. The mode transition control device as recited in claim 1, wherein
the mode transition controller selects the ICE gear shift stage based on the rotational speed change amount of the internal combustion engine when an accelerator position opening amount is less than a first predetermined opening amount, and selects the ICE gear shift stage based on a required driving force when the accelerator position opening amount is greater than or equal to the first predetermined opening amount.

12. The mode transition control device as recited in claim 11, wherein
the mode transition controller selects the ICE gear shift stage in which a rotational speed of the internal combustion engine becomes the lowest as the ICE gear shift stage, when the accelerator position opening amount is less than a second predetermined opening amount, which is smaller than the first predetermined opening amount.

13. The mode transition control device as recited in claim 1, wherein
the mode transition controller sets the predetermined threshold value, with respect to when the rotational speed of the internal combustion engine increases, to a value that is smaller than the predetermined threshold value of when the rotational speed of the internal combustion engine decreases.

14. The mode transition control device as recited in claim 1, wherein
the mode transition controller sets the values of the predetermined threshold values to be larger as the accelerator position opening amount is increased.

* * * * *